United States Patent
Bowman

(10) Patent No.: US 10,100,957 B2
(45) Date of Patent: Oct. 16, 2018

(54) SPLIT RING COUPLING

(71) Applicant: Victaulic Company, Easton, PA (US)

(72) Inventor: Matthew A. Bowman, Palmer, PA (US)

(73) Assignee: Victaulic Company, Easton, PA (US)

( * ) Notice: Subject to any disclaimer, the term of this patent is extended or adjusted under 35 U.S.C. 154(b) by 675 days.

(21) Appl. No.: 14/574,984

(22) Filed: Dec. 18, 2014

(65) Prior Publication Data

US 2015/0176728 A1  Jun. 25, 2015

Related U.S. Application Data

(60) Provisional application No. 61/120,138, filed on Dec. 23, 2013.

(51) Int. Cl.
 *F16L 17/04* (2006.01)
 *F16L 21/06* (2006.01)
 *F16L 21/08* (2006.01)

(52) U.S. Cl.
 CPC ............. *F16L 21/065* (2013.01); *F16L 17/04* (2013.01); *F16L 21/08* (2013.01)

(58) Field of Classification Search
 CPC ....... F16L 17/04; F16L 21/065; F16L 37/088; F16L 21/08
 USPC .......................... 285/373, 364, 367, 406, 419
 See application file for complete search history.

(56) References Cited

U.S. PATENT DOCUMENTS

| | | | | |
|---|---|---|---|---|
| 2,225,208 A | * | 12/1940 | Crickmer | ................ F16L 17/04 285/373 X |
| 2,369,770 A | * | 2/1945 | Baxter | .................. F16L 37/088 |
| 2,449,795 A | * | 9/1948 | Stillwagon | ............... F16L 17/04 285/367 X |
| 3,116,078 A | * | 12/1963 | Scherer | ................... F16L 17/04 285/373 X |
| 6,065,784 A | | 5/2000 | Lundstrom | |
| 6,170,884 B1 | * | 1/2001 | McLennan | .............. F16L 17/04 |

(Continued)

FOREIGN PATENT DOCUMENTS

| CN | 101317032 A | 12/2008 |
|---|---|---|
| CN | 102597591 A | 7/2012 |

(Continued)

OTHER PUBLICATIONS

Copenheaver, Blaine R.; International Search Report from corresponding International Patent Application No. PCT/US2014/071078, dated Apr. 1, 2014, pp. 1-2, United States Patent and Trademark Office as International Search Authority, Alexandria, Virginia.

(Continued)

*Primary Examiner* — Greg Binda
*Assistant Examiner* — Zachary T Dragicevich
(74) *Attorney, Agent, or Firm* — Ballard Spahr LLP

(57) ABSTRACT

A pipe coupling has segments attached end to end to define a central space that receives pipe elements inserted between the segments. The segments are supported on split rings received within grooves in each segment. The segments are supported in spaced relation in a preassembled state to permit insertion without disassembly of the coupling. The grooves in the segments have a floor surface with three surface portions. Two of the surface portions on each groove of each segment engage the split rings when the segments are supported in spaced relation.

45 Claims, 8 Drawing Sheets

(56) References Cited

U.S. PATENT DOCUMENTS

| | | |
|---|---|---|
| 8,517,430 B2 | 8/2013 | Dole et al. |
| 9,285,060 B2 * | 3/2016 | Griggs, III .............. F16L 17/04 |
| 2008/0048444 A1 | 2/2008 | Porter et al. |
| 2008/0284161 A1 | 11/2008 | Dole et al. |
| 2013/0127160 A1 | 5/2013 | Bancroft et al. |
| 2013/0200610 A1 | 8/2013 | Cygler, III et al. |

FOREIGN PATENT DOCUMENTS

| | | |
|---|---|---|
| CN | 103270359 A | 8/2013 |
| DE | 1216627 | 5/1966 |

OTHER PUBLICATIONS

Copenheaver, Blaine R.; Written Opinion from corresponding International Patent Application No. PCT/US2014/071078, dated Apr. 1, 2014, pp. 1-6, United States Patent and Trademark Office as International Search Authority, Alexandria, Virginia.

Balzer, Ralf; Supplementary European Search Report from counterpart European patent application No. EP14874829; dated Mar. 14, 2017; pp. 1-2, European Patent Office, Munich Germany.

Balzer, Ralf; European Search Opinion from counterpart European patent application No. EP14874829; dated Mar. 14, 2017; pp. 1-3, European Patent Office, Munich Germany.

Author Unknown; Office Action from counterpart Chinese patent application No. 2014800703823; dated Apr. 21, 2017; pp. 1-12; Translated by China Patent Agent (H.K.) Ltd; Hong Kong.

* cited by examiner

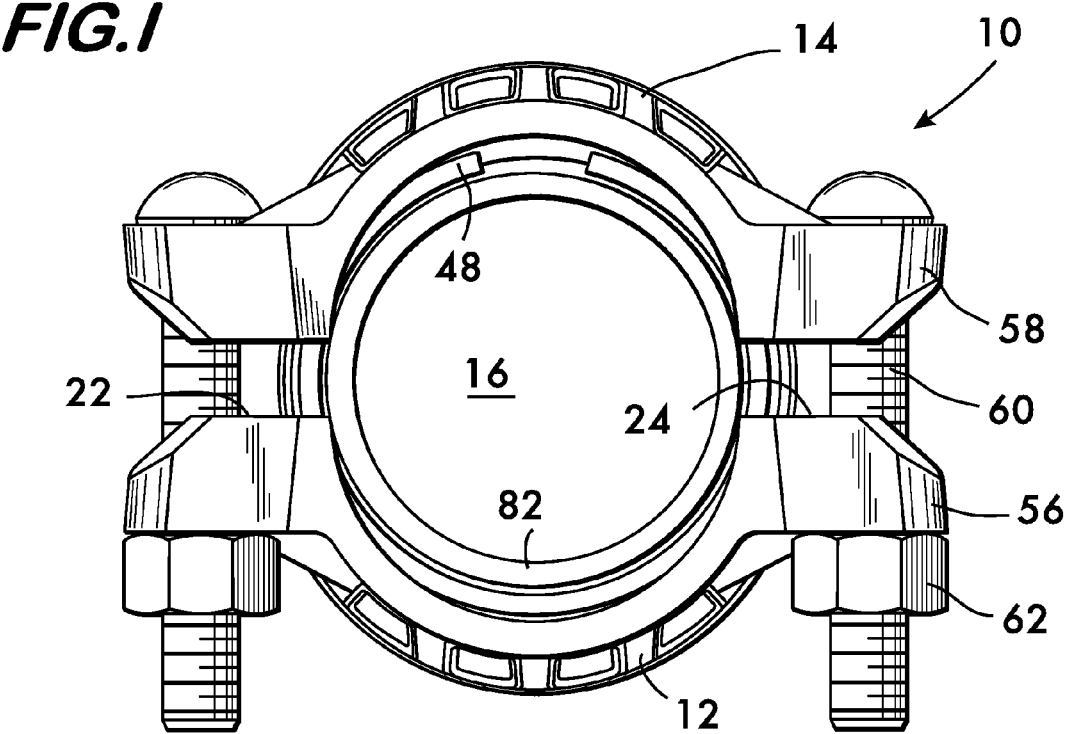
FIG. I
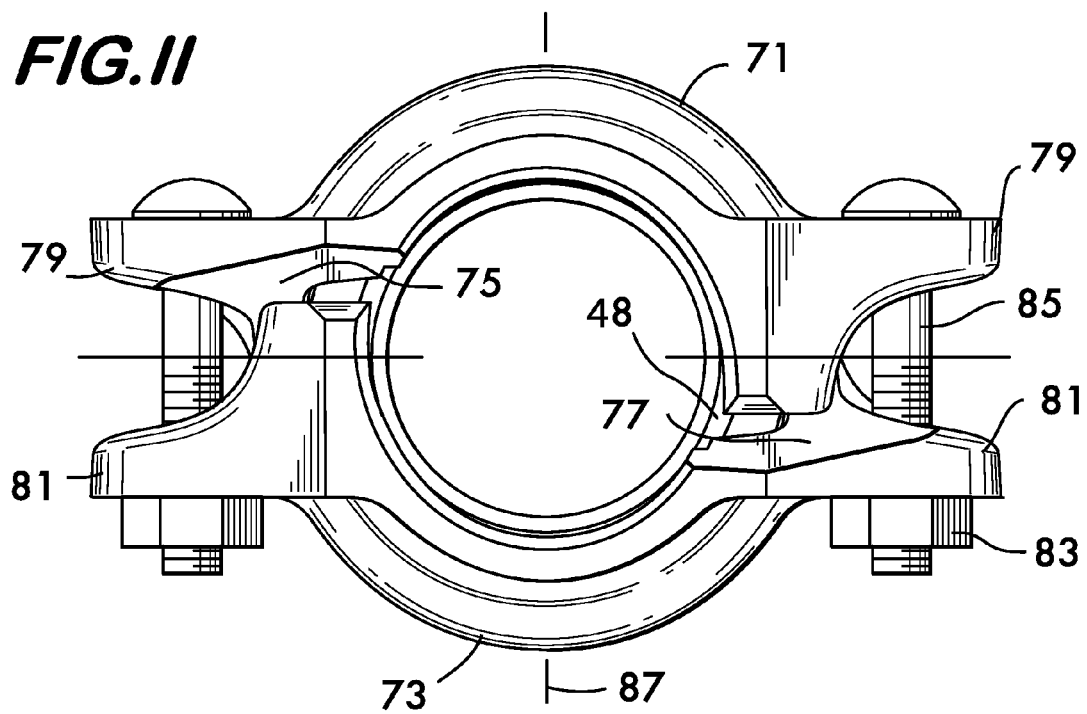
FIG. II

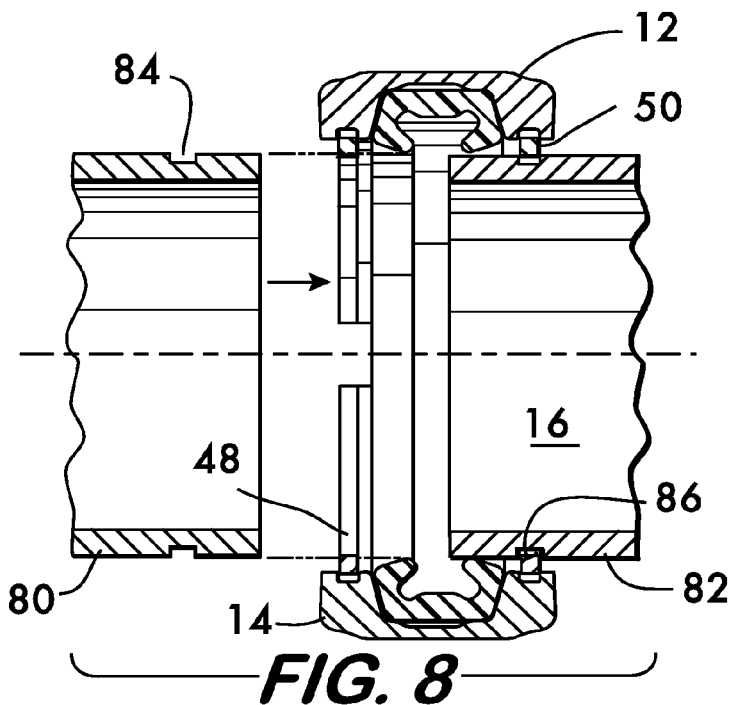
FIG. 8
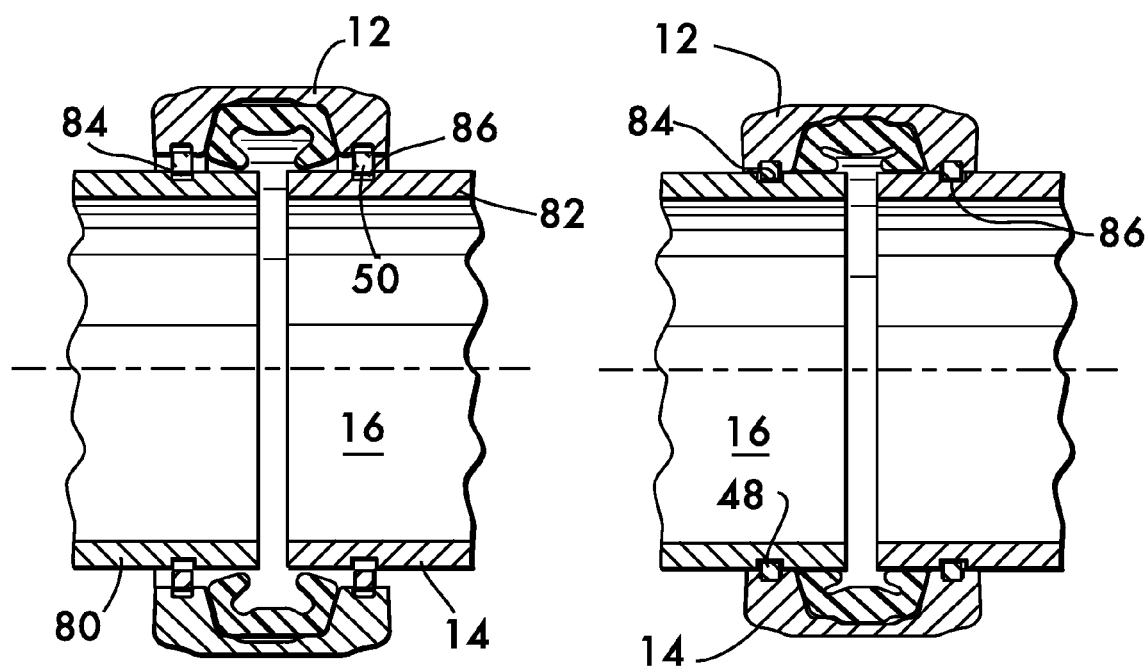
FIG. 9
FIG. 10

SPLIT RING COUPLING

CROSS REFERENCE TO RELATED APPLICATION

This application is a non-provisional of and claims benefit of priority to U.S. Provisional Patent Application No. 61/120,138, filed Dec. 23, 2013, which provisional application is hereby incorporated by reference herein.

FIELD OF THE INVENTION

This invention relates to mechanical pipe couplings for joining pipe elements in end to end relation.

BACKGROUND

Prior art mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe-like form. Pipe elements include pipe stock, pipe fittings such as elbows, caps and tees as well as fluid control components such as valves, reducers, strainers, restrictors, pressure regulators and the like.

Each mechanical coupling segment comprises a housing having arcuate surfaces which project radially inwardly from the housing and engage plain end pipe elements, shoulder end pipe elements, shoulder and bead pipe elements or circumferential grooves that extend around each of the pipe elements to be joined. Engagement between the arcuate surfaces and the pipe elements provides mechanical restraint to the joint and ensures that the pipe elements remain coupled even under high internal pressure and external forces. The housings define an annular channel that receives a gasket or seal, typically an elastomeric ring which engages the ends of each pipe element and cooperates with the segments to provide a fluid tight seal. The segments have connection members, typically in the form of lugs which project outwardly from the housings. The lugs are adapted to receive fasteners, such as nuts and bolts, which are adjustably tightenable to draw the segments toward one another.

To ensure a good fit between the couplings and the pipe elements, the arcuate surfaces on prior art couplings have a radius of curvature that is substantially matched to the radius of curvature of the outer surface of the pipe element that it is intended to engage. For couplings used with grooved pipe elements, the radii of curvature of the arcuate surfaces are smaller than the radii of curvature of the outer surfaces of the pipe elements outside of the grooves so that the arcuate surfaces fit within and engage the grooves properly.

This geometrical relation between the arcuate surfaces of the couplings and the outer surfaces of the pipe elements in prior art couplings results in a time consuming installation process when mechanical couplings are used. Typically, the coupling is received by the technician with the segments bolted together and the ring seal captured within the segments' channels. The technician first disassembles the coupling by unbolting it, removes the ring seal, lubricates it (if not pre-lubricated) and places it around the ends of the pipe elements to be joined. Installation of the ring seal requires that it be lubricated and stretched significantly to accommodate the pipe elements, an often difficult and messy task, as the ring seal is usually stiff and the lubrication makes manual manipulation of the seal difficult. With the ring seal in place on both pipe elements, the segments are then placed one at a time straddling the ends of the pipe elements and capturing the ring seal against them. During placement, the segments engage the seal, the arcuate surfaces are aligned with the grooves when present, or with alignment marks made on the outside surfaces of the pipe elements, the bolts are inserted through the lugs, the nuts are threaded onto the bolts and tightened, drawing the coupling segments toward one another, compressing the seal and engaging the arcuate surface within the grooves.

As evident from the previous description, installation of mechanical pipe couplings according to the prior art requires that the technician typically handle at least seven individual piece parts (and more when the coupling has more than two segments), and must totally disassemble and reassemble the coupling. Significant time, effort and expense would be saved if the technician could install a mechanical pipe coupling without first totally disassembling it and then reassembling it, piece by piece.

SUMMARY

The invention concerns a coupling for joining pipe elements in end to end relation. In one example embodiment, the coupling comprises a plurality of segments attached to one another end to end in spaced apart relation. The segments surround a central space for receiving the pipe elements. Each of the segments has a channel extending between the ends. Each of the segments has first and second grooves extending between the ends. The grooves are positioned in spaced relation from one another on opposite sides of the channel. Each of the grooves are defined by two side surfaces arranged in spaced relation, and a floor surface extending therebetween. Each floor surface comprises first and second surface portions arranged respectively at opposite ends of the segments, and a third surface portion positioned therebetween. The first and second surface portions each have a greater radius of curvature than the third surface portion. The example coupling also includes a first split ring positioned within the first groove and a second split ring positioned within the second groove. The first and second split rings engage the first and second surface portions of the floors in the first and second grooves and support the segments in spaced apart relation.

In a particular example embodiment, at least one of the split rings has an outer radius of curvature and an inner radius of curvature. The inner radius of curvature is at least equal to an outer radius of the pipe elements in this example. Furthermore in this example, the radius of curvature of the first and second surface portions on at least one of the segments is substantially equal to the outer radius of curvature of the at least one split ring.

In an example embodiment, at least one of the split rings supports the segments in a preassembled state wherein the segments are supported on the at least one split ring in spaced apart relation sufficient to allow the pipe elements to be inserted into the central space. In this example embodiment, the at least one split ring has sufficient stiffness to maintain the segments in the preassembled state through handling of the coupling during insertion of the pipe elements.

By way of example, at least one of the first and second surface portions has a length extending from about 5% to about 30% of a total length of at least one of the grooves. In a further example, at least one of the split rings has a rectangular cross sectional shape. In another example embodiment, at least one of the split rings comprises a plurality of teeth arranged in spaced relation to one another.

The teeth extend circumferentially around the at least one split ring and project toward a center of the central space.

The coupling according to another example embodiment further comprises a seal positioned within the channels of the segments. By way of example, the seal comprises a flexible, resilient ring having ring inner surfaces adapted to engage outer surfaces of the pipe elements. The ring inner surfaces have a diameter sized to receive the pipe elements upon insertion of the pipe elements between the segments.

In a particular example embodiment, the ring inner surfaces comprise first and second lips extending circumferentially around the ring. The lips are positioned on opposite sides of the ring in spaced apart relation and project substantially inwardly toward one another. The lips are adapted to engage the pipe elements and form a fluid tight seal when the ring is compressed by the segments. By way of example, the first and second lips each have a conical surface facing outwardly from the ring. The conical surfaces have a width sized to engage and guide the pipe elements between the segments when the pipe elements are inserted therebetween.

In an example embodiment, the sealing member comprises a backwall and first and second sidewalls positioned in spaced apart relation on opposite sides of the ring. The sidewalls extend substantially radially inwardly from the backwall. The first lip is attached to the first sidewall and the second lip is attached to the second sidewall. A tongue is attached to the backwall. The tongue extends circumferentially around the ring. The tongue is positioned between the first and the second lips and projects substantially radially inwardly in this example embodiment. The tongue engages ends of the pipe elements upon insertion thereof between the segments.

Further by way of example, the segments comprise adjustably tightenable connection members for drawing the segments toward the central space. The adjustably tightenable connection members include a plurality of fasteners. The fasteners extend between the segments and hold the segments together in a preassembled state wherein the segments are supported on the at least one split ring.

An example embodiment further comprises at least a first angularly oriented surface located on a first one of the segments, and at least a second angularly oriented surface located on a second one of the segments. The first and second angularly oriented surfaces are in facing relation and slide over one another when the fasteners are tightened to bring the first and second angularly oriented surfaces in contact. Sliding motion between the first and second angularly oriented surfaces causes the first and second segments to rotate in opposite directions relatively to one another.

In another example embodiment, a coupling for joining pipe elements in end to end relation comprises a plurality of segments attached to one another end to end in spaced apart relation and surrounding a central axis and defining a central space for receiving the pipe elements. Each of the segments has a channel defined by a back wall extending between the ends of the segments. Each of the back walls has a surface facing the central axis. Each of the segments has first and second grooves extending between the ends. The grooves are positioned in spaced relation from one another on opposite sides of the channel. Each of the grooves is defined by two side surfaces arranged in spaced relation and a floor surface extending therebetween. Each the floor surfaces face the central axis. A first split ring is positioned within the first groove and a second split ring positioned within the second groove of the segments. At least one of the first and second split rings engage at least one of the floor surfaces in one of the first and second grooves proximate to the ends of the at least one segment and thereby support the segments in the spaced apart relation. For the at least one segment, a distance between the surface of the back wall and the floor surface, as measured along a radially projecting line extending from the central axis, is a first value at a first point midway between the ends of the at least one segment, and a second value at a second point proximate to at least one of the ends of the at least one segment. The first value is greater than the second value.

By way of example, the coupling for joining pipe elements in end to end relation comprises a plurality of segments attached to one another end to end in spaced apart relation and surrounding a central space for receiving the pipe elements. Each of the segments has a channel extending between the ends. Each of the segments has at least one groove extending between the ends. The at least one groove is positioned adjacent to the channel. The at least one groove is defined by two side surfaces arranged in spaced relation and a floor surface extending therebetween. The floor surface comprises first and second surface portions arranged respectively at opposite ends of the segments, and a third surface portion positioned therebetween. The first and second surface portions each have a greater radius of curvature than the third surface portion in this example embodiment. A split ring is positioned within the at least one groove. The split ring engages the first and second surface portions of the floors and supports the segments in spaced apart relation.

In a particular example embodiment, the split ring has an outer radius of curvature and an inner radius of curvature. The inner radius of curvature is at least equal to an outer radius of the pipe elements, and, the radius of curvature of the first and second surface portions on at least one of the segments is substantially equal to the outer radius of curvature of the split ring.

In an example embodiment, the split ring supports the segments in a preassembled state wherein the segments are supported on the split ring in spaced apart relation sufficient to allow the pipe elements to be inserted into the central space. In a particular example embodiment, the split ring has sufficient stiffness to maintain the segments in the preassembled state through handling of the coupling during insertion of the pipe elements.

By way of example, at least one of the first and second surface portions has a length extending from about 5% to about 30% of a total length of at least one of the grooves. In a further example, the split ring has a rectangular cross sectional shape. In another example, the split ring comprises a plurality of teeth arranged in spaced relation to one another and extending circumferentially around the split ring. The teeth project toward a center of the central space in this example.

The invention further encompasses a coupling for joining pipe elements in end to end relation. In another example embodiment, the coupling comprises a plurality of segments attached to one another end to end in spaced apart relation and surrounding a central space for receiving the pipe elements. Each of the segments has a channel extending between the ends. Each of the segments has first and second grooves extending between the ends. The grooves are positioned in spaced relation from one another on opposite sides of the channel. Each of the grooves is defined by two side surfaces arranged in spaced relation and a floor surface extending therebetween. Each floor surface comprises first and second surface portions arranged respectively at opposite ends of the segments and a third surface portion positioned therebetween. The first and second surface portions each have a center of curvature offset from a center of curvature of the third surface portion. A first split ring is positioned within the first groove, and a second split ring is positioned within the second groove. The first and second split rings engage the first and second surface portions of the floors in the first and second grooves and support the segments in the spaced apart relation.

In a particular example embodiment, at least one of the split rings has an outer radius of curvature and an inner radius of curvature. The inner radius of curvature is at least equal to an outer radius of the pipe elements. In this example embodiment, the first and second surface portions on at least one of the segments have respective radii of curvature substantially equal to the outer radius of curvature of the at least one split ring.

In another example embodiment, at least one of the split rings supports the segments in a preassembled state wherein the segments are supported on the at least one split ring in spaced apart relation sufficient to allow the pipe elements to be inserted into the central space.

By way of example, the at least one split ring has sufficient stiffness to maintain the segments in the preassembled state through handling of the coupling during insertion of the pipe elements.

In an example embodiment, at least one of the first and second surface portions has a length extending from about 5% to about 30% of a total length of at least one of the grooves.

In a particular example embodiment, at least one of the split rings has a rectangular cross sectional shape. In another example embodiment, at least one of the split rings comprises a plurality of teeth arranged in spaced relation to one another. The teeth extend circumferentially around the at least one split ring. The teeth project toward a center of the central space.

BRIEF DESCRIPTION OF THE DRAWINGS

FIG. 1 is an axial view of an example pipe coupling according to the invention;
FIGS. 8-10 are longitudinal sectional views illustrating a method of using the pipe couplings according to the invention;
and
FIG. 11 is an axial view of an example coupling according to the invention.

DETAILED DESCRIPTION

Figure 1A:
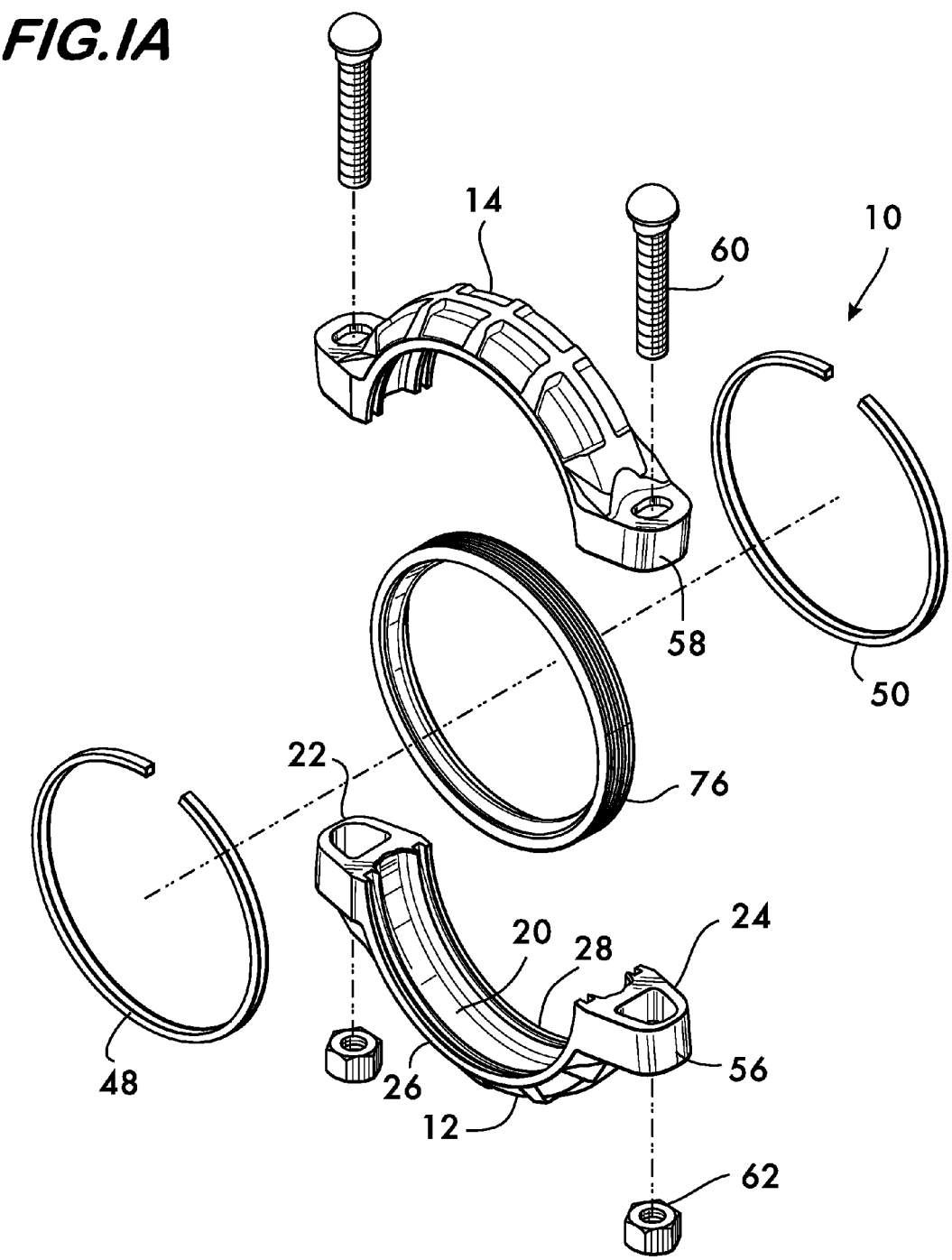
FIG. 1A is an isometric exploded view of the pipe coupling shown in FIG. 1.
Figure 2:
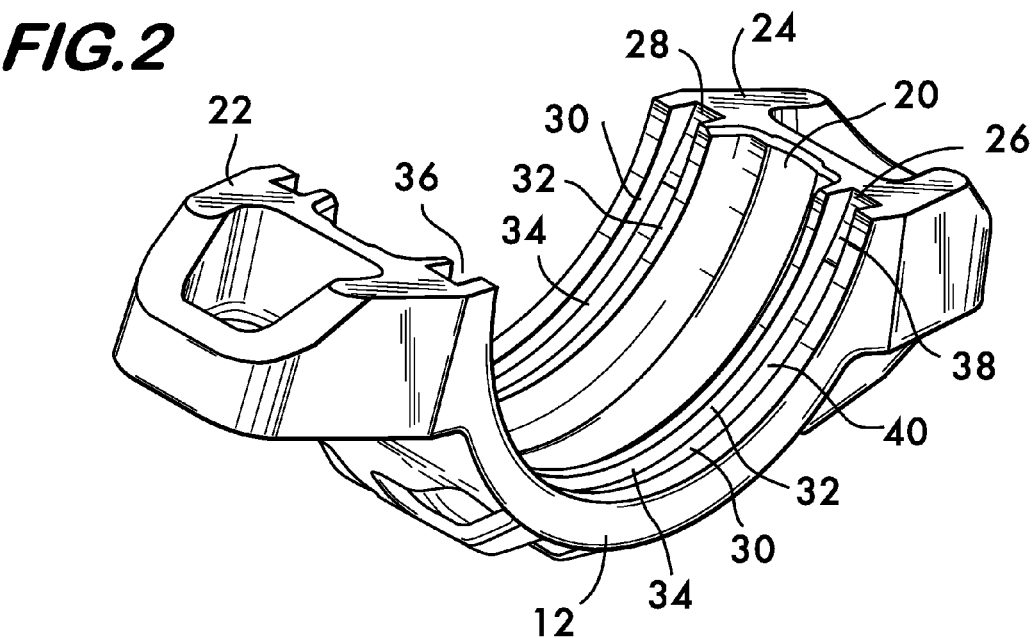
FIG. 2 is an isometric view of a segment from the pipe coupling shown in FIG. 1.

FIGS. 1 and 1A show an example coupling 10 according to the invention. Coupling 10 comprises a plurality of segments, in this example, two segments 12 and 14 attached to one another end to end surrounding a central space 16. As shown in FIG. 2, each of the segments 12 and 14 (12 shown) has a channel 20 that extends between the ends 22 and 24 of the segments. Each segment 12 and 14 also has first and second grooves 26 and 28. Grooves 26 and 28 extend between ends 22 and 24 of the segments and are positioned in spaced relation from one another on opposite sides of the channel 20. Each groove 26 and 28 is defined by two side surfaces 30 and 32, arranged in spaced relation, and a floor surface 34 that extends between the side surfaces. As shown in FIGS. 2 and 3, floor surface 34 comprises three surface portions 36, 38 and 40. The first and second surface portions 36 and 38 are arranged, respectively, at opposite ends 22 and 24 of the segments 12 and 14. The third surface portion 40 is positioned between the first and second surface portions 36 and 38. Each of the first and second surface portions 36 and 38 has a respective radius of curvature 42 and 44, and these radii are larger than the radius of curvature 46 of the third surface portion 40. The first and second surface portions 36 and 38 advantageously have a length from about 5% to about 30% of the total length of one of the grooves 26, 28.

As shown in FIGS. 1, 1A and 3, coupling 10 includes first and second split rings 48 and 50. Split ring 48 is positioned within groove 26 and split ring 50 is positioned within groove 28 of the segments 12 and 14. With reference to FIG. 3, the split rings (48 being shown) have an outer radius of curvature 52 and an inner radius of curvature 54. In their undeformed state, the outer radii of curvature 52 of the split rings is sized so that the split rings 48 and 50 engage the first and second surface portions 36 and 38 of floor surface 34 and thereby support the segments 12 and 14 in spaced apart relation sufficient to permit pipe elements to be inserted into the central space 16 as described in detail below. This spaced configuration of the segments (shown in FIGS. 1 and 3) is known as the "preassembled state", and the stiffness of the split rings 48 and 50 is sufficient to maintain the segments 12 and 14 in this preassembled state during shipping, handling and assembly of the joint. It is advantageous that the radii of curvature 42 and 44 of the first and second surface portions 36 and 38 of the floor surface 34 of the grooves 26 and 28 be substantially equal to the radii of curvature of the split rings 48 and 50 in their undeformed state. Further to this end, when in their undeformed state, the inner radii of curvature 54 of the split rings 48 and 50 are sized to be at least as large as the maximum radius of the pipe elements that the coupling 10 is intended to join. This permits insertion of the pipe elements into the central space 16 when the coupling 10 is in its preassembled state as described below.

Figure 4:
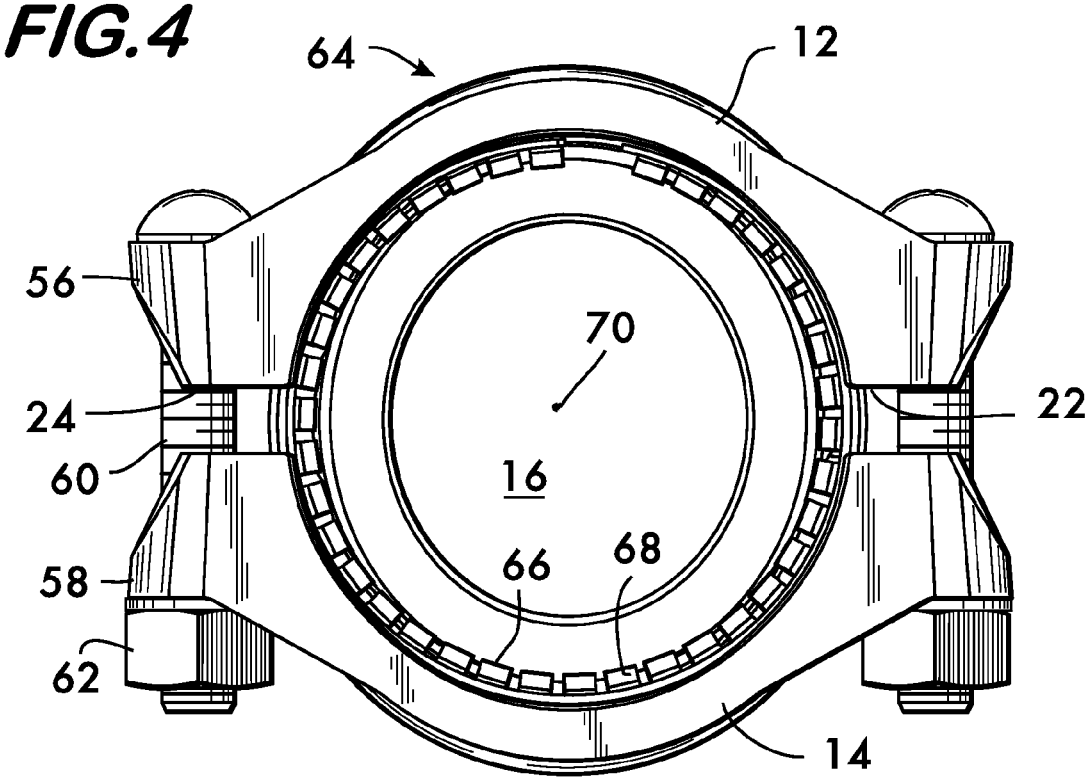
FIGS. 4 and 5 are axial views of another example embodiment of a pipe coupling according to the invention.
Figure 5:
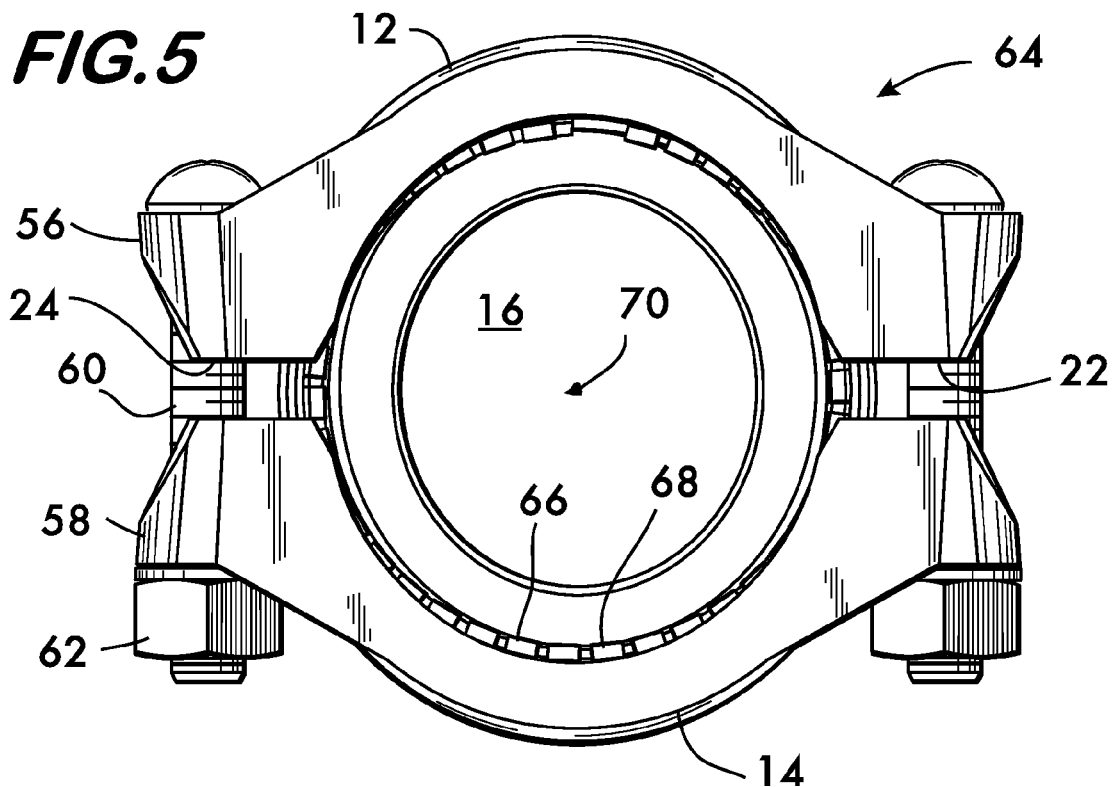
Figure 5A:
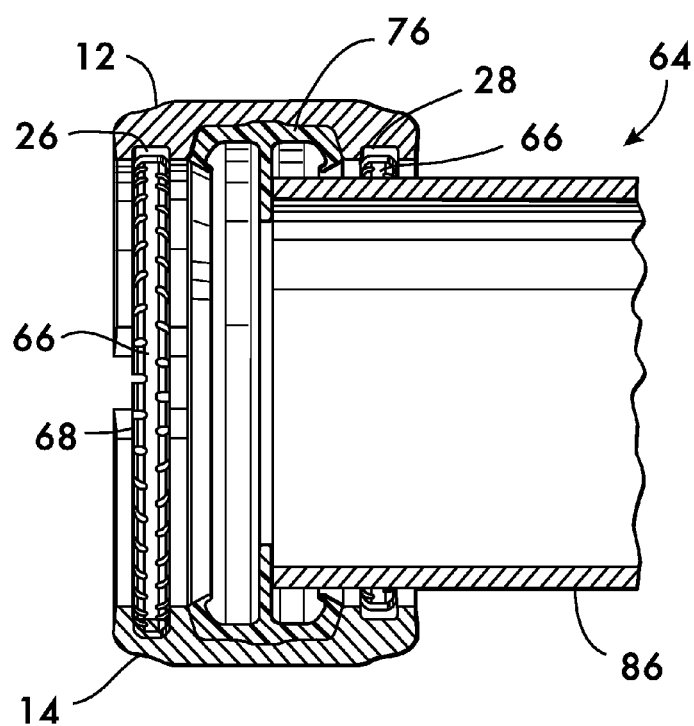
FIG. 5A is a longitudinal sectional view of the pipe coupling shown in FIGS. 4 and 5.

In the preassembled state, the segments 12 and 14 are attached to one another end to end surrounding the central space 16 and are supported in spaced relation to one another as shown in FIG. 1, the spacing being sufficient to permit pipe elements to be inserted between the segments 12 and 14 into the central space 16. Interconnection of the segments 12 and 14 is effected by connection members, preferably in the form of lugs 56 and 58 shown in FIGS. 1 and 2. The lugs are preferably positioned at each end of each segment and project outwardly from the segments. Lugs 56 and 58 are positioned in facing relation to one another and adapted to receive fasteners, preferably in the form of bolts 60 and nuts 62 which are adjustably tightenable and cooperate with the lugs 56 and 58 for adjustably connecting the coupling segments to one another as discussed in further detail below. The stiffness of the split rings 48 and 50, while sufficient to support the segments 12 and 14 in the spaced relation of the preassembled state, is not so great that it prevents the use of hand tools to tighten the bolts 60 and nuts 62 to draw the segments 12 and 14 toward the central space 16, thereby deforming the split rings to the point where their outer radii of curvature 52 are smaller and substantially equal to the radii of the third surface portion 40 of the grooves 26 and 28. The inner radii 54 of curvature also become smaller as the split rings deform to permit them to engage grooves in pipe elements and provide mechanical engagement between the coupling 10 and the pipe elements to retain the pipe elements to the coupling against externally applied forces as well as forces due to internal pressure within the pipe elements that would tend to cause separation of the joint. (Other types of pipe elements, for example, shouldered and shoulder and bead pipe elements may also be effectively engaged by the inner radii of curvature 54.) When used with grooved pipe elements it is advantageous that the split rings have a rectangular cross sectional shape (as shown in FIG. 1A) so as to provide substantially continuous engagement within the grooves. In an another coupling embodiment 64, shown in FIGS. 4, 5 and 5A, the split rings 66 comprise a plurality of teeth 68. Teeth 68 are arranged in spaced relation to one another and extend circumferentially around the split rings 66. Split rings 66 are used advantageously with plain end pipe elements. The teeth 68 project toward the center 70 of the central space 16 and are forced into engagement with the outer surface of the plain end pipe when the split rings 66 are deformed by tightening the bolts 60 and nuts 62 to draw segments 12 and 14 toward the central space 16. The teeth bite into the pipe elements to provide the desired mechanical engagement to secure the pipe elements to the coupling. Use of either type of split ring (toothed or rectangular cross section) is expected to provide pipe couplings with exceptional stiffness. The segments are advantageously formed of metal, such as iron, and the split rings may be formed of spring steel, stainless steel, beryllium copper, as well as polymers including plastics such as nylon and acrylonitrile butadiene styrene (ABS).

Figure 3B:
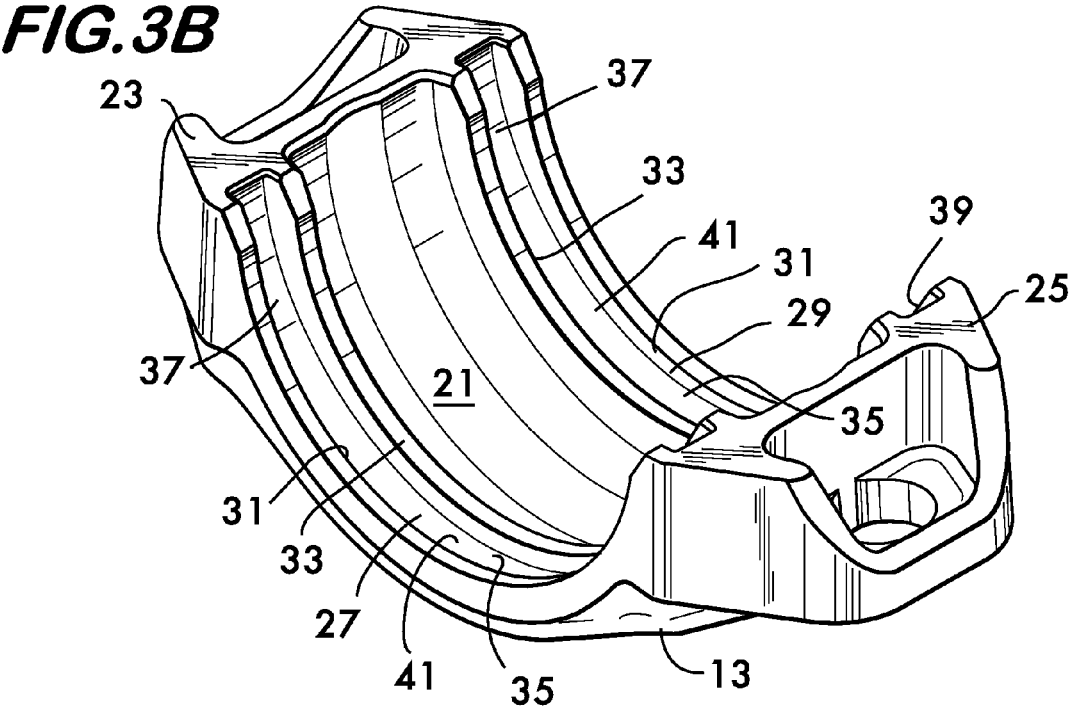
FIG. 3B is an isometric view of a segment from the pipe coupling shown in FIG. 3A.
Figure 3:
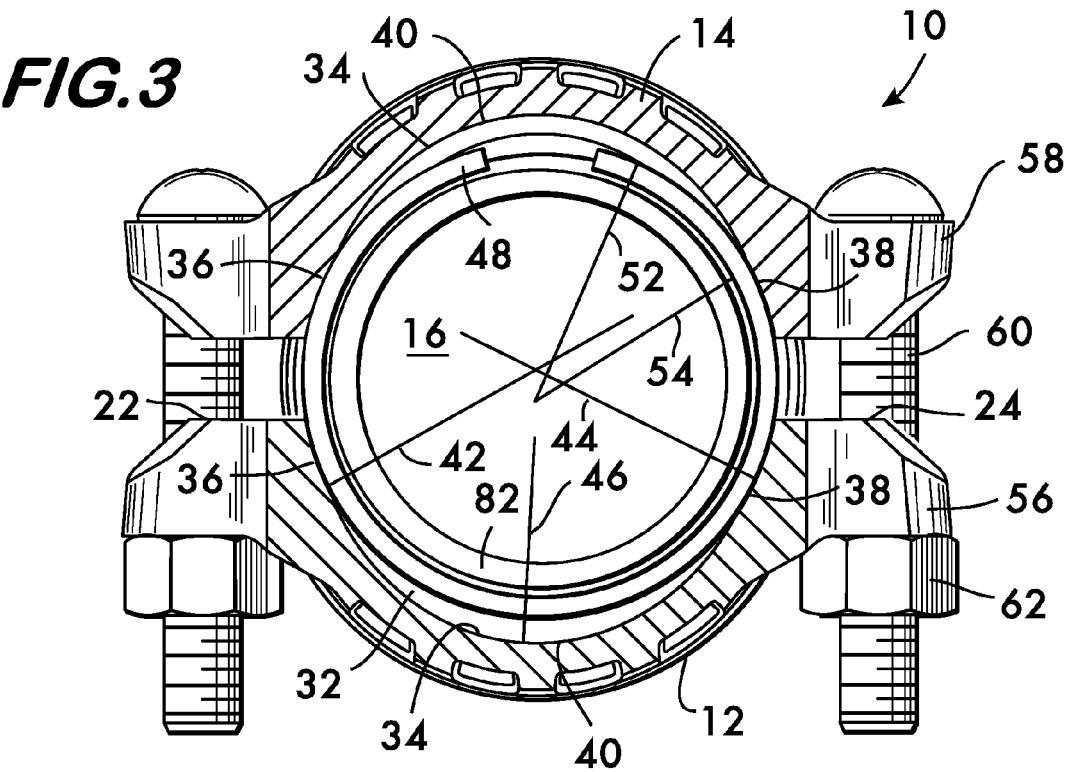
FIG. 3 is a partial cross sectional view of the pipe coupling shown in FIG. 1.
Figure 3A:
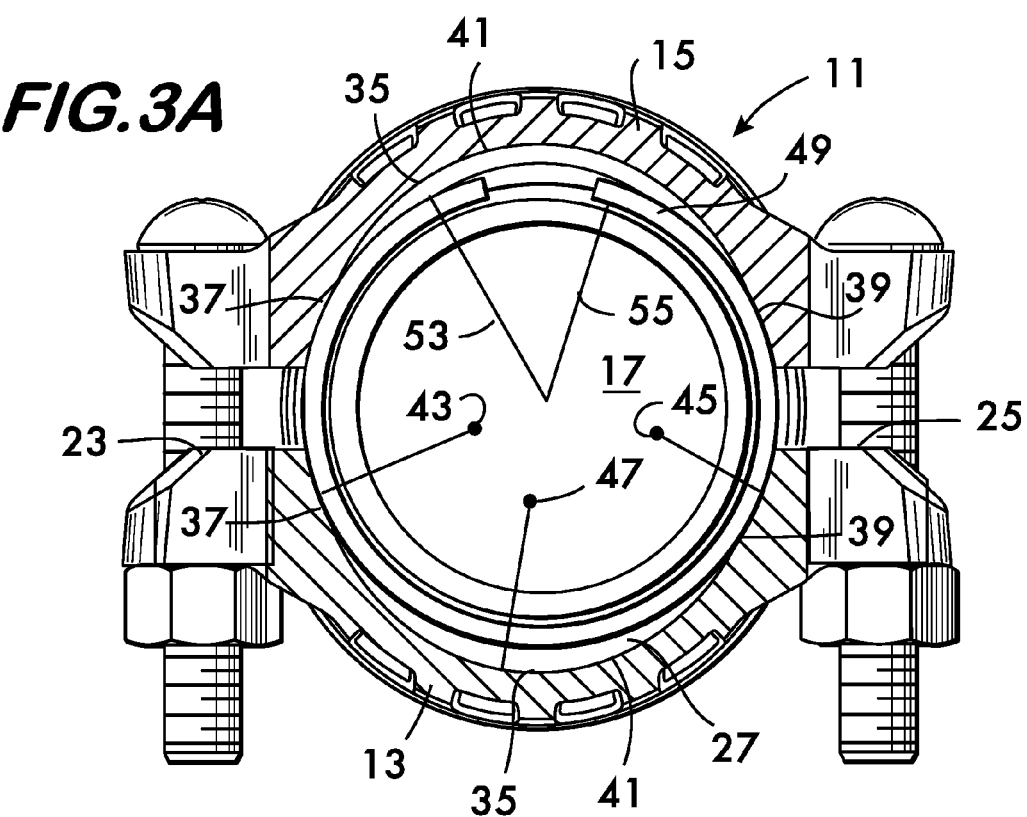
FIG. 3A is a partial cross sectional view of an example embodiment of a pipe coupling according to the invention.

FIGS. 3A and 3B show another example coupling 11 according to the invention. Similar to coupling 10, coupling 11 comprises a plurality of segments, in this example, two segments 13 and 15 attached to one another end to end surrounding a central space 17. As shown in FIG. 3B, each of the segments 13 and 15 (13 shown) has a channel 21 that extends between the ends 23 and 25 of the segments. Each segment 13 and 15 also has first and second grooves 27 and 29. Grooves 27 and 29 extend between ends 23 and 25 of the segments and are positioned in spaced relation from one another on opposite sides of the channel 21. Each groove 27 and 29 is defined by two side surfaces 31 and 33, arranged in spaced relation, and a floor surface 35 that extends between the side surfaces. As shown in FIGS. 3A and 3B, floor surface 35 comprises three surface portions 37, 39 and 41. The first and second surface portions 37 and 39 are arranged, respectively, at opposite ends 23 and 25 of the segments 13 and 15. The third surface portion 41 is positioned between the first and second surface portions 37 and 39. Each of the first and second surface portions 37 and 39 has a respective center of curvature 43 and 45, and these centers of curvature are offset from (i.e., not coincident with) the center of curvature 47 of the third surface portion 41. The first and second surface portions 37 and 39 advantageously have a length from about 5% to about 30% of the total length of one of the grooves 27, 29.

Similar to coupling 10, coupling 11 includes first and second split rings 49 and 51 (49 shown). Split ring 49 is positioned within groove 27 and split ring 51 is positioned within groove 29 of the segments 13 and 15 (see FIG. 3B). With reference to FIG. 3A, the split rings (49 being shown) have an outer radius of curvature 53 and an inner radius of curvature 55. In their undeformed state, the outer radii of curvature 53 of the split rings is sized so that the split rings 49 and 51 engage the first and second surface portions 37 and 39 of floor surface 35 and thereby support the segments 13 and 15 in spaced apart relation sufficient to permit pipe elements to be inserted into the central space 17 as described in detail below. This spaced configuration of the segments (shown in FIG. 3A) is known as the "preassembled state", and the stiffness of the split rings 49 and 51 is sufficient to maintain the segments 13 and 15 in this preassembled state during shipping, handling and assembly of the joint. It is advantageous if the radii of curvature of the first and second surface portions 37 and 39 of the floor surface 35 of the grooves 27 and 29 are substantially equal to the radii of curvature of the split rings 49 and 51 in their undeformed state. Further to this end, when in their undeformed state, the inner radii of curvature 55 of the split rings 49 and 51 are sized to be at least as large as the maximum radius of the pipe elements that the coupling 11 is intended to join. This permits insertion of the pipe elements into the central space 17 when the coupling 11 is in its preassembled state as described below. Note that for coupling 11, the radii of curvature of the first and second surface portions 37 and 39 have no required relationship to the radius of curvature of the third surface portion 41, unlike coupling 10, wherein the radii of curvature 42 and 44 of surface portions 36 and 38 are greater than the radius of curvature 46 of the third surface portion 40.

Figure 3C:
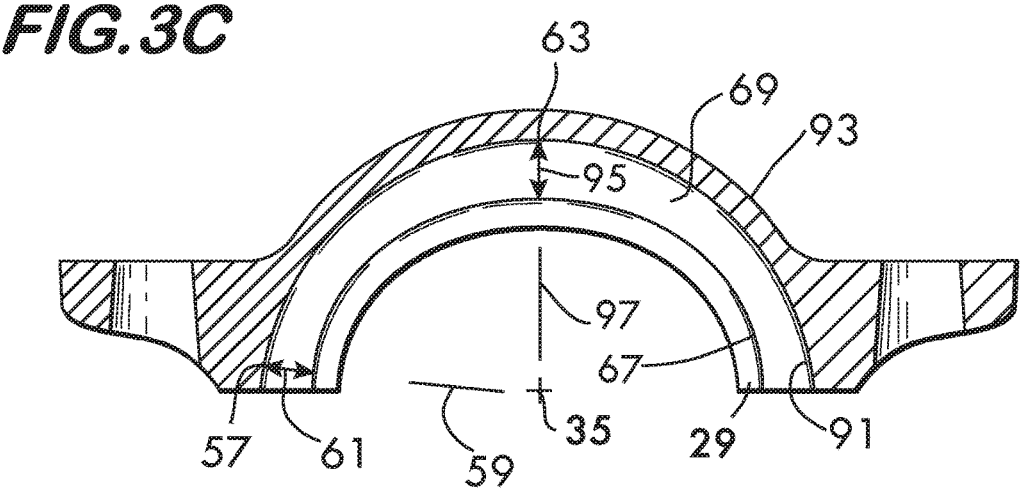
FIGS. 3C, 3D and 3E are cross sectional views of example embodiments of coupling segments according to the invention.

As shown in FIG. 3C, example coupling segments 93 according to the invention may also be described by the geometric relation between the back wall 91 extending between the ends of the segment and defining the channel 69, and the floor surface 67 of the groove 29 that receives the split rings (not shown). The geometric relation which permits the split rings to support the segments 93 in spaced relation as described above relates to a first distance 95, measured between the surface of back wall 91 and the floor surface 67 of groove 29 along a radially projecting line 97 between a central axis 35 (for example, the longitudinal axis of pipe elements being joined by the segment) and a point 63 midway between the ends of the segment 93, and a second distance 61, measured between the surface of back wall 91 and the floor surface 67 of groove 29 along a radially projecting line 59 between central axis 35 and a point 57 proximate to one end of the segment 93. The value of the first distance 95 is greater than the value of the second distance 61 for segments according to the invention.

Figure 3D:
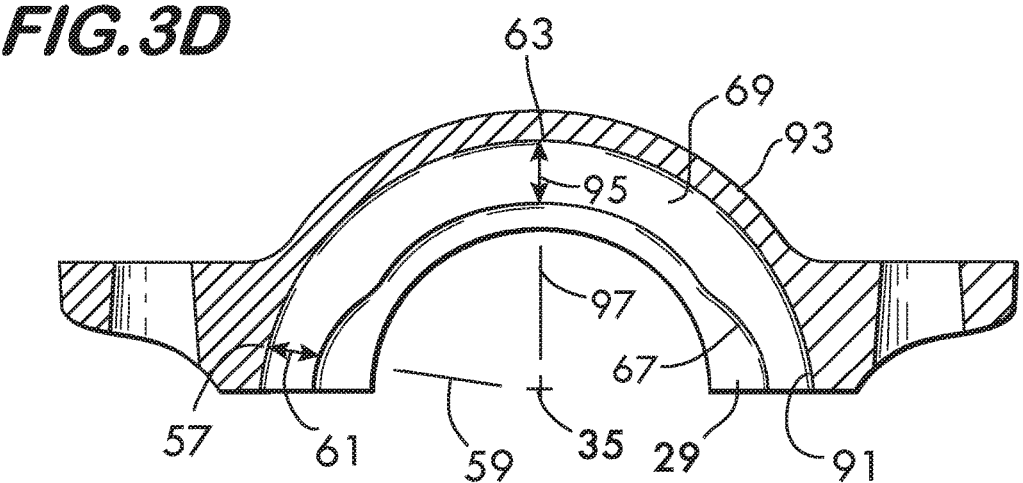
Figure 3E:
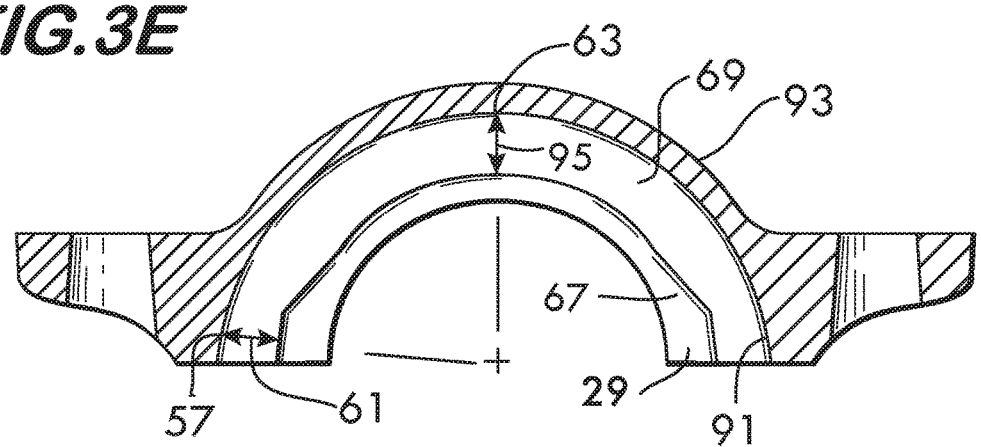

This geometric condition may be accomplished, for example as shown in FIG. 3C by continuously changing the curvature of the floor surface 67 as it traverses between the points 63 and 57. In another example, shown in FIG. 3D, the curvature of floor surface 67 is changed abruptly in the regions proximate to the ends of segment 93. FIG. 3E shows floor surface 67 formed of faceted, straight segments in the regions proximate to the ends of the segments to receive the split rings for support of the segments in spaced relation.

Figure 6:
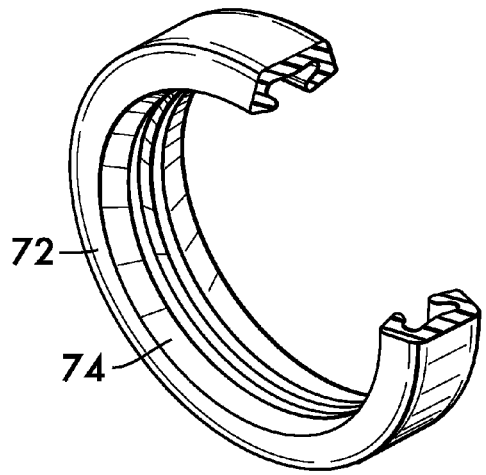
FIGS. 6 and 7 are isometric views of example seals used with the pipe couplings according to the invention.
Figure 7:
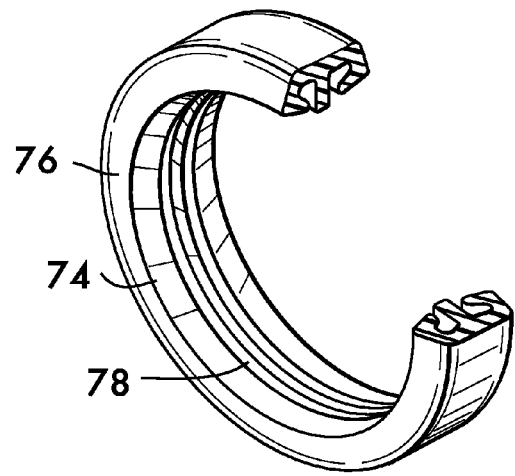

FIGS. 6 and 7 show examples of seals used with couplings 10, 11 and 64 according to the invention. Seal 72 (FIG. 6) is preferably a flexible, resilient ring formed from elastomeric material. The seal may have lips 74 that use the internal pressure within the pipes to increase the sealing force between the seal and the outer surfaces of the pipe elements. As shown in FIG. 7, another seal embodiment 76 may also have a tongue 78 positioned between the lips 74, the tongue extending circumferentially around the seal and projecting radially inwardly. Tongue 78 provides a stop surface that engages the ends of pipe elements to ensure proper positioning of the seal 76 relatively to the pipe elements. Engagement of the pipe elements with tongue 78 also effects alignment of the pipe engaging surfaces with the grooves (if present), or with alignment marks on the outside surface of the pipe elements. Seals 72 and 76 are received within channels 20 (see FIGS. 1A and 2) of the couplings 10 and 64.

Assembly of a pipe joint is illustrated in FIGS. 8-10. After both pipe elements 80 and 82 are inserted into coupling 10 as shown in FIGS. 8 and 9, nuts 62 are tightened (see also FIG. 1). The nuts 62 cooperate with their bolts 60 to draw the segments 12 and 14 toward the central space 16. Tightening of the nuts exerts a force on the lugs 56 and 58 which compresses the split rings 48 and 50 and causes them to deform such that they engage the outer surfaces of the pipe elements 80 and 82 within grooves 84 and 86. For plain end pipe (see FIGS. 4 and 5), compression of the split rings 66 causes their teeth 68 to bite into the outer surface of the pipe elements. Deformation of the split rings 48 and 50 is preferably substantially elastic, allowing them to spring back substantially to their original shape when the nuts 62 are loosened, thereby permitting the coupling 10 to be reused in the manner according to the invention as described herein. The split rings may also be designed to have significant plastic deformation, wherein the deformation imparts a permanent set to the rings. For practical couplings, there will generally be some degree of both plastic and elastic deformation occurring in the split rings as a result of tightening the fasteners. The seal 72 is also deformed by this process, with the lips 74 coming into full engagement with the pipe element outer surfaces. Because the seal 72 is substantially volumetrically incompressible, it must be provided with space into which it may expand when radially compressed by the segments.

The joint stiffness may be increased using coupling segments 71 and 73 as shown in FIG. 11. In addition to having the grooves and split rings as described above, segments 71 and 73 also have angularly oriented surfaces 75 (on segment 71) and 77 (on segment 73). Surfaces 75 and 77 in this example are located adjacent to the connection members 79 and 81. Surfaces 75 on segment 71 are in respective facing relation with surfaces 77 on segment 73. As the nuts 83 are tightened on bolts 85 the segments 71 and 73 are drawn toward one another and into contact so that the surfaces 75 engage and slide over surfaces 77. As the slopes of the surfaces 75 and 77 are opposite to one another on opposite ends of the couplings the sliding motion between the surfaces causes the segments 71 and 73 to rotate in opposite directions relatively to one another about axis 87 and force the split rings (not shown) to engage the side surfaces of the grooves in which they are received, thereby adding rigidity to the joint.

As shown in FIGS. 1 and 3, for the preassembled coupling 10, it is advantageous to hold nuts 62 in a position on bolts 60 that will maintain the segments 12 and 14 in the desired spaced apart relation as determined by contact between the segments and the split rings 48 and 50.

What is claimed is:

1. A coupling for joining pipe elements in end to end relation, said coupling comprising:
   a plurality of segments attached to one another end to end in a preassembled state, in spaced apart relation and surrounding a central space prior to receiving said pipe elements, each of said segments having a channel extending between said ends, each of said segments having first and second grooves extending between said ends, said grooves being positioned in spaced relation from one another on opposite sides of said channel, each of said grooves defined by two side surfaces arranged in spaced relation and a floor surface extending therebetween, each said floor surface comprising first and second surface portions arranged respectively at opposite ends of said segments and a third surface portion positioned therebetween, said first and second surface portions each having a greater radius of curvature than said third surface portion;
   a first split ring positioned within said first groove and a second split ring positioned within said second groove, said first and second split rings engaging said first and second surface portions of said floors in said first and second grooves.

2. The coupling according to claim 1, wherein said first and second split rings support said segments in said spaced apart relation.

3. The coupling according to claim 1, wherein:
   at least one of said split rings has an outer radius of curvature and an inner radius of curvature, said inner radius of curvature being at least equal to an outer radius of said pipe elements.

4. The coupling according to claim 3, wherein said radius of curvature of said first and second surface portions on at least one of said segments is substantially equal to said outer radius of curvature of said at least one split ring.

5. The coupling according to claim 1, wherein at least one of said split rings supports said segments in a preassembled state in spaced apart relation sufficient to allow said pipe elements to be inserted into said central space.

6. The coupling according to claim 5, wherein said at least one split ring has sufficient stiffness to maintain said segments in said preassembled state through handling of said coupling during insertion of said pipe elements.

7. The coupling according to claim 1, wherein at least one of said first and second surface portions has a length extending from about 5% to about 30% of a total length of at least one of said grooves.

8. The coupling according to claim 1, wherein at least one of said split rings has a rectangular cross sectional shape.

9. The coupling according to claim 1, wherein at least one of said split rings comprises a plurality of teeth arranged in spaced relation to one another and extending circumferentially around said at least one split ring, said teeth projecting toward a center of said central space.

10. The coupling according to claim 1, further comprising a seal positioned within said channels of said segments.

11. The coupling according to claim 10, wherein said seal comprises a flexible, resilient ring having ring inner surfaces adapted to engage outer surfaces of said pipe elements, said ring inner surfaces having a diameter sized to receive said pipe elements upon insertion of said pipe elements between said segments.

12. The coupling according to claim 1, wherein said segments comprise adjustably tightenable connection members for drawing said segments toward said central space.

13. The coupling according to claim 12, wherein said adjustably tightenable connection members include a plurality of fasteners, said fasteners extending between said segments and holding said segments together in a preassembled state.

14. The coupling according to claim 13, further comprising:

at least a first angularly oriented surface located on a first one of said segments;

at least a second angularly oriented surface located on a second one of said segments, said first and second angularly oriented surfaces being in facing relation and sliding over one another when said fasteners are tightened to bring said first and second angularly oriented surfaces in contact, sliding motion between said first and second angularly oriented surfaces causing said first and second segments to rotate in opposite directions relatively to one another.

15. A coupling for joining pipe elements in end to end relation, said coupling comprising:

a plurality of segments attached to one another end to end in a preassembled state, in spaced apart relation and surrounding a central space prior to receiving said pipe elements, each of said segments having a channel extending between said ends, each of said segments having at least one groove extending between said ends, said at least one groove being positioned adjacent to said channel, said at least one groove defined by two side surfaces arranged in spaced relation and a floor surface extending therebetween, said floor surface comprising first and second surface portions arranged respectively at opposite ends of said segments and a third surface portion positioned therebetween, said first and second surface portions each having a greater radius of curvature than said third surface portion;

a split ring positioned within said at least one groove, said split ring engaging said first and second surface portions of said floor surface.

16. The coupling according to claim 15, wherein said split ring supports said segments in said spaced apart relation.

17. The coupling according to claim 15, wherein:

said split ring has an outer radius of curvature and an inner radius of curvature, said inner radius of curvature being at least equal to an outer radius of said pipe elements.

18. The coupling according to claim 17, wherein said radius of curvature of said first and second surface portions on at least one of said segments is substantially equal to said outer radius of curvature of said split ring.

19. The coupling according to claim 15, wherein said split ring supports said segments in a preassembled state in spaced apart relation sufficient to allow said pipe elements to be inserted into said central space.

20. The coupling according to claim 15, wherein at least one of said first and second surface portions has a length extending from about 5% to about 30% of a total length of at least one of said grooves.

21. The coupling according to claim 15, further comprising a seal positioned within said channels of said segments.

22. The coupling according to claim 15, wherein said segments comprise adjustably tightenable connection members for drawing said segments toward said central space.

23. A coupling for joining pipe elements in end to end relation, said coupling comprising:

a plurality of segments attached to one another end to end in a preassembled state, in spaced apart relation and surrounding a central axis and defining a central space prior to receiving said pipe elements;

each of said segments having a channel defined by a back wall extending between said ends of said segments, each of said back walls having a surface facing said central axis;

each of said segments having first and second grooves extending between said ends, said grooves being positioned in spaced relation from one another on opposite sides of said channel, each of said grooves defined by two side surfaces arranged in spaced relation and a floor surface extending therebetween, each said floor surface facing said central axis;

a first split ring positioned within said first groove and a second split ring positioned within said second groove of said segments, at least one of said first and second split rings engaging at least one of said floor surfaces in one of said first and second grooves proximate to said ends of said at least one segment and thereby supporting said segments in said spaced apart relation;

wherein, for said at least one segment:

a distance between said surface of said back wall and said floor surface, as measured radially from said central axis, being a first value at a first point midway between said ends of said at least one segment and a second value at a second point proximate to at least one of said ends of said at least one segment, said first value being greater than said second value.

24. The coupling according to claim 23, wherein said first and second split rings support said segments in said spaced apart relation.

25. The coupling according to claim 23, wherein:

at least one of said split rings has an outer radius of curvature and an inner radius of curvature, said inner radius of curvature being at least equal to an outer radius of said pipe elements.

26. The coupling according to claim 25, wherein said radius of curvature of said first and second surface portions on at least one of said segments is substantially equal to said outer radius of curvature of said at least one split ring.

27. The coupling according to claim 23, wherein at least one of said split rings supports said segments in a preassembled state in spaced apart relation sufficient to allow said pipe elements to be inserted into said central space.

28. The coupling according to claim 27, wherein said at least one split ring has sufficient stiffness to maintain said segments in said preassembled state through handling of said coupling during insertion of said pipe elements.

29. The coupling according to claim 23, wherein at least one of said first and second surface portions has a length extending from about 5% to about 30% of a total length of at least one of said grooves.

30. The coupling according to claim 23, wherein at least one of said split rings has a rectangular cross sectional shape.

31. The coupling according to claim 23, wherein at least one of said split rings comprises a plurality of teeth arranged in spaced relation to one another and extending circumferentially around said at least one split ring, said teeth projecting toward a center of said central space.

32. The coupling according to claim 23, further comprising a seal positioned within said channels of said segments.

33. The coupling according to claim 32, wherein said seal comprises a flexible, resilient ring having ring inner surfaces adapted to engage outer surfaces of said pipe elements, said ring inner surfaces having a diameter sized to receive said pipe elements upon insertion of said pipe elements between said segments.

34. The coupling according to claim 23, wherein said segments comprise adjustably tightenable connection members for drawing said segments toward said central space.

35. The coupling according to claim 34, wherein said adjustably tightenable connection members include a plurality of fasteners, said fasteners extending between said segments and holding said segments together in a preassembled state.

36. The coupling according to claim 35, further comprising:
at least a first angularly oriented surface located on a first one of said segments;
at least a second angularly oriented surface located on a second one of said segments, said first and second angularly oriented surfaces being in facing relation and sliding over one another when said fasteners are tightened to bring said first and second angularly oriented surfaces in contact, sliding motion between said first and second angularly oriented surfaces causing said first and second segments to rotate in opposite directions relatively to one another.

37. A coupling for joining pipe elements in end to end relation, said coupling comprising:
a plurality of segments attached to one another end to end in a preassembled state, in spaced apart relation and surrounding a central axis and defining a central space prior to receiving said pipe elements;
each of said segments having a channel defined by a back wall extending between said ends, each of said back walls having a surface facing said central axis;
each of said segments having at least one groove extending between said ends of said segments, said at least one groove being positioned adjacent to said channel, said at least one groove defined by two side surfaces arranged in spaced relation and a floor surface extending therebetween, said floor surface facing said central axis;
a split ring positioned within said at least one groove, said split ring engaging said floor surface in at least one of said grooves proximate to said ends of at least one of said segments and supporting said segments in said spaced apart relation; wherein, for at least said one segment:
a distance between said surface of said back wall and said floor surface, as measured radially from said central axis, being a first value at a first point midway between said ends of said at least one segment, and a second value at a second point proximate to at least one of said ends of said at least one segment, said first value being greater than said second value.

38. The coupling according to claim 37, wherein said split ring supports said segments in said spaced apart relation.

39. The coupling according to claim 38, wherein: said split ring has an outer radius of curvature and an inner radius of curvature, said inner radius of curvature being at least equal to an outer radius of said pipe elements.

40. The coupling according to claim 39, wherein said radius of curvature of said first and second surface portions on at least one of said segments is substantially equal to said outer radius of curvature of said split ring.

41. The coupling according to claim 37, wherein said split ring supports said segments in a preassembled state in spaced apart relation sufficient to allow said pipe elements to be inserted into said central space.

42. The coupling according to claim 37, wherein at least one of said first and second surface portions has a length extending from about 5% to about 30% of a total length of at least one of said grooves.

43. The coupling according to claim 37, further comprising a seal positioned within said channels of said segments.

44. The coupling according to claim 37, wherein said segments comprise adjustably tightenable connection members for drawing said segments toward said central space.

45. A coupling for joining pipe elements in end to end relation, said coupling comprising:
a plurality of segments attached to one another end to end in spaced apart relation and surrounding a central space for receiving said pipe elements, each of said segments having a channel extending between said ends, each of said segments having first and second grooves extending between said ends, said grooves being positioned in spaced relation from one another on opposite sides of said channel, each of said grooves defined by two side surfaces arranged in spaced relation and a floor surface extending therebetween, each said floor surface comprising first and second surface portions arranged respectively at opposite ends of said segments and a third surface portion positioned therebetween, said first and second surface portions each having a center of curvature offset from a center of curvature of said third surface portion;
a first split ring positioned within said first groove and a second split ring positioned within said second groove, said first and second split rings engaging said first and second surface portions of said floors in said first and second grooves and supporting said segments in said spaced apart relation.

* * * * *